United States Patent [19]

Konagaya

[11] Patent Number: 5,532,787
[45] Date of Patent: Jul. 2, 1996

[54] PHOTOGRAPHIC PRINTING SHUTTER

[75] Inventor: Tatsuya Konagaya, Kanagawa, Japan

[73] Assignee: Fuji Photo Film Co., Ltd., Kanagawa, Japan

[21] Appl. No.: 315,482

[22] Filed: Sep. 30, 1994

[30] Foreign Application Priority Data

Oct. 14, 1993 [JP] Japan .................................. 5-257325
Oct. 14, 1993 [JP] Japan .................................. 5-257326

[51] Int. Cl.$^6$ ................................................ G03B 7/08
[52] U.S. Cl. ............................ 355/71; 355/35; 354/234.1; 354/254; 354/265
[58] Field of Search ................................. 354/234.1, 254, 354/265; 355/35, 71

[56] References Cited

U.S. PATENT DOCUMENTS

| | | | |
|---|---|---|---|
| 3,945,027 | 3/1976 | Kimura et al. | 354/261 |
| 4,469,996 | 9/1984 | Oltendorf | 318/696 |
| 4,474,464 | 10/1984 | Kanai et al. | |
| 4,631,458 | 12/1986 | Furuichi | 318/254 |
| 4,905,043 | 2/1990 | Satou et al. | |
| 5,083,154 | 1/1992 | Terashita et al. | 355 X/71 |
| 5,202,721 | 4/1993 | Kobayashi et al. | 354/441 |

FOREIGN PATENT DOCUMENTS

| | | |
|---|---|---|
| 58-149028 | 9/1983 | Japan . |
| 63-279238 | 11/1988 | Japan . |
| 1-185540 | 7/1989 | Japan . |

*Primary Examiner*—Russell E. Adams
*Assistant Examiner*—Daniel P. Malley
*Attorney, Agent, or Firm*—Sughrue, Mion, Zinn, Macpeak & Seas

[57] ABSTRACT

A photographic printing shutter includes a pair of semicircular shutter bodies for cutting off printing light or allowing it to pass, at least one pair of rotatable shafts disposed substantially parallel to the axis of the printing light with the axis thereof interposed therebetween and respectively fixed to the pair of semicircular shutter bodies, and drive motors for respectively rotating the pair of semicircular shutter bodies between a closing position where the pair of semicircular shutter bodies cuts off the printing light and an opening position where the pair of semicircular shutter bodies allows the printing light to pass. The pair of semicircular shutters is rotated every 180° so that a uniform exposure time can be obtained at any portion in a light transmissive window.

17 Claims, 8 Drawing Sheets

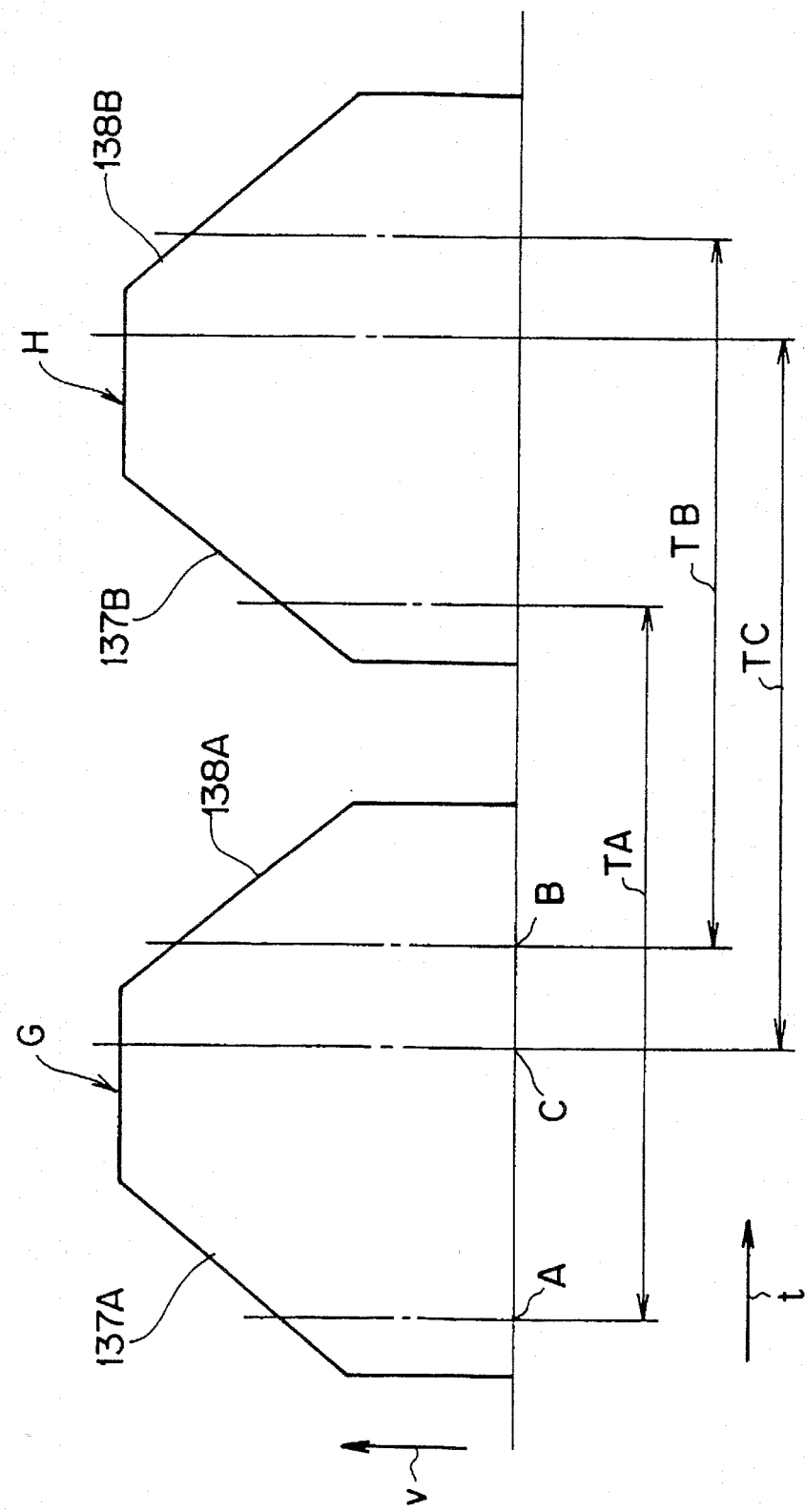

PHOTOGRAPHIC PRINTING SHUTTER

BACKGROUND OF THE INVENTION

1. Field of the Invention

The present invention relates to a photographic printing shutter employed when an image recorded on an original-image recording film such as a negative film is printed onto a photosensitive material such as photographic paper.

2. Description of the Related Art

A shutter used in a photographic printer, for allowing printing light to pass between a negative film and photographic paper and cutting off the printing light therebetween, is generally constructed in the following manner. Shutter bodies supported by bearings are energized by an urging force produced by a tensile coil spring or the like so as to be brought into a state in which the shutter bodies cut off the printing light. When an image is to be printed, the shutter bodies are withdrawn from the axis of the printing light against the urging force due to the exciting force of a solenoid to thereby release a printing optical path (i.e., to allow the printing light to pass between the negative film and the photographic paper).

Therefore, shutter bodies each having a large area are required to allow the shutter bodies to reliably open and close a printing-light transmissive window. The more the area of the printing-light transmissive window increases, the more shutter bodies having larger areas are required.

Shifting each of the shutter bodies to a releasing position by the solenoid and moving each of them to a closing position by an urging force of the coil spring leads to the problem that the traveling speed of each shutter body is not kept constant and releasing times differ from each other at individual points in the printing-light transmissive window, so that an exposure time at the entire area of a printing image becomes nonuniform (i.e., the shutter causes nonuniformity).

When an image recorded on a negative film is printed onto photographic paper by the photographic printer, a process for determining a standard exposure condition is required prior to a printing process.

To this end, an ND filter corresponding to a light attenuating filter is inserted into an optical path for printing and exposure so as to expose the photographic paper to light under an exposure determined based on a measured value of the intensity of light and a standard exposure condition. The ND filter is normally disposed on the optical path and adjacent to a printing light source to facilitate the removal of the ND filter.

Since, however, the ND filter is disposed near the light source, characteristics of the ND filter vary due to the heat produced from the light source. Thus, the ND filter may be mounted to a portion away from the light source. However, since it is necessary to remove the ND filter upon printing, the ND filter needs to be disposed in a position where an operator can easily work. Therefore, the ND filter is complicated in structure.

SUMMARY OF THE INVENTION

It its an object of the present invention to provide a photographic printing shutter wherein shutter bodies for opening and closing a printing-light transmissive window and cutting off the same can be made smaller as compared with conventional shutter bodies.

It is another object of the present invention to provide a photographic printing shutter wherein an exposure time becomes uniform at all points in a printing-light transmissive window.

It is a further object of the present invention to provide a photographic printing shutter with a light attenuating filter, which makes it unnecessary to use a specially-mounted structure.

According to a first aspect of the present invention, there is provided a photographic printing shutter comprising:

a pair of shutter bodies each shaped in the form of a sector, for cutting off printing light and allowing the printing light to pass;

a pair of rotatable shafts disposed substantially parallel to the axis of the printing light and respectively fixed to the pair of sectorial shutter bodies, the axis being interposed between the pair of rotatable shafts; and driving means for respectively rotatably shifting the pair of sectorial shutter bodies between a closing position where the pair of sectorial shutter bodies cuts off the printing light and an opening position where the pair of sectorial shutter bodies allows the printing light to pass.

The sector may preferably be a semicircle. In this case, a turning angle formed between the closing and releasing positions of the shutter bodies may preferably be 180°.

A single pair of shutter bodies is driven between the position to cut off the printing light and the position to allow the printing light to pass. A single shutter body does not need to have an area for cutting off the printing light. An area may be taken which is sufficient to enable the printing light to be cut off when the pair of shutter bodies overlaps each other. Accordingly, the shutter bodies can be reduced in size and the entire space necessary for a printing device can be reduced.

Since each of the shutter bodies has an acceleration and a deceleration at early and final stages of its rotation under the action of a motor or the like for driving a shutter, the conventional shutter results in different exposure times at respective portions in a printing-light transmissive window. According to the specific embodiment of the present invention, when the semicircular shutter bodies are respectively rotated every 180° between the closing and opening positions, a variation in exposure time, which occurs upon opening the printing-light transmissive window, and a variation in exposure time, which takes place upon closing the printing-light transmissive window, are canceled out, so that a uniform exposure time can be obtained at any portion in the printing-light transmissive window.

According to a second aspect of the present invention, there is provided a photographic printing shutter comprising:

a rotatable shaft disposed so as to be substantially parallel to an optical axis;

a shutter body shaped in the form of a sector, for cutting off light and allowing the same to pass, the sectorial shutter body being fixed to the rotatable shaft so that the rotatable shaft is disposed substantially in a center of rotation of the sector; and a motor for rotatably driving the rotatable shaft between a closing position where the shutter body cuts off the light and an opening position where the shutter body allows the light to pass, and stopping the rotatable shaft at the closing and opening positions.

As used herein, the "center of rotation of the sector" refers to the center of the circle of which the sector is a part.

According to a third aspect of the present invention, there is provided a photographic printing shutter comprising:

a pair of rotatable shafts disposed substantially parallel to an axis of printing light;

a pair of shutter bodies respectively fixed to the pair of rotatable shafts and rotated about the pair of rotatable shafts so as to move between a closing position where the pair of shutter bodies cuts off the printing light and an opening position where the pair of shutter bodies allows the printing light to pass, the pair of rotatable shafts being disposed so that the pair of shutter bodies overlap each other at the closing position;

a light attenuating filter provided within one of the pair of shutter bodies so as to fall within an area where the pair of shutter bodies overlap each other in the closing position; and at least one driving means for rotating the pair of shutter bodies about the pair of rotatable shafts, the driving means being able to select a mode for simultaneously rotating the pair of shutter bodies and a mode for rotating the other of the pair of shutter bodies alone.

By rotating and shifting only the other of the pair of shutter bodies when an exposure condition has been determined, a photosensitive material can be irradiated with the printing light through the light attenuating filter disposed in one of the pair of shutter bodies. On the other hand, when the shutter is in the closing position upon photographic printing, the pair of shutter bodies is disposed so as to overlap each other. The light attenuating filter attached to the one of the pair of shutter bodies is cut off by the other of the pair of shutter bodies. Thus, when the shutter is in the closing position, the printing light does not reach a photosensitive material such as photographic paper or the like.

According to a fourth aspect of the present invention, there is provided a method of controlling an exposure time using a photographic printing shutter, comprising the steps of:

positioning a pair of semicircular shutters, which respectively have rotatable shafts each located in the center of rotation of a semicircle, at a position where the pair of semicircular shutters closes a light transmissive window;

rotating the pair of semicircular shutters by 180° about the rotatable shafts so as to open the light transmissive window; and further rotating the pair of semicircular shutters by 180° so as to return the semicircular shutters to the closing position, thereby allowing the same quantity of light to pass at every portion in the light transmissive window.

According to the method, a uniform exposure time can be obtained at any portion in the light transmissive window upon exposure.

BRIEF DESCRIPTION OF THE DRAWINGS

The above and other objects, features and advantages of the present invention will become apparent from the following description and the appended claims, taken in conjunction with the accompanying drawings in which:

FIG. 8 is a diagram showing the relationship between the shutter release time and the rotational speed of a shutter.

DETAILED DESCRIPTION OF THE PREFERRED EMBODIMENTS (Overall structure of photographic printer)

Figure 1:
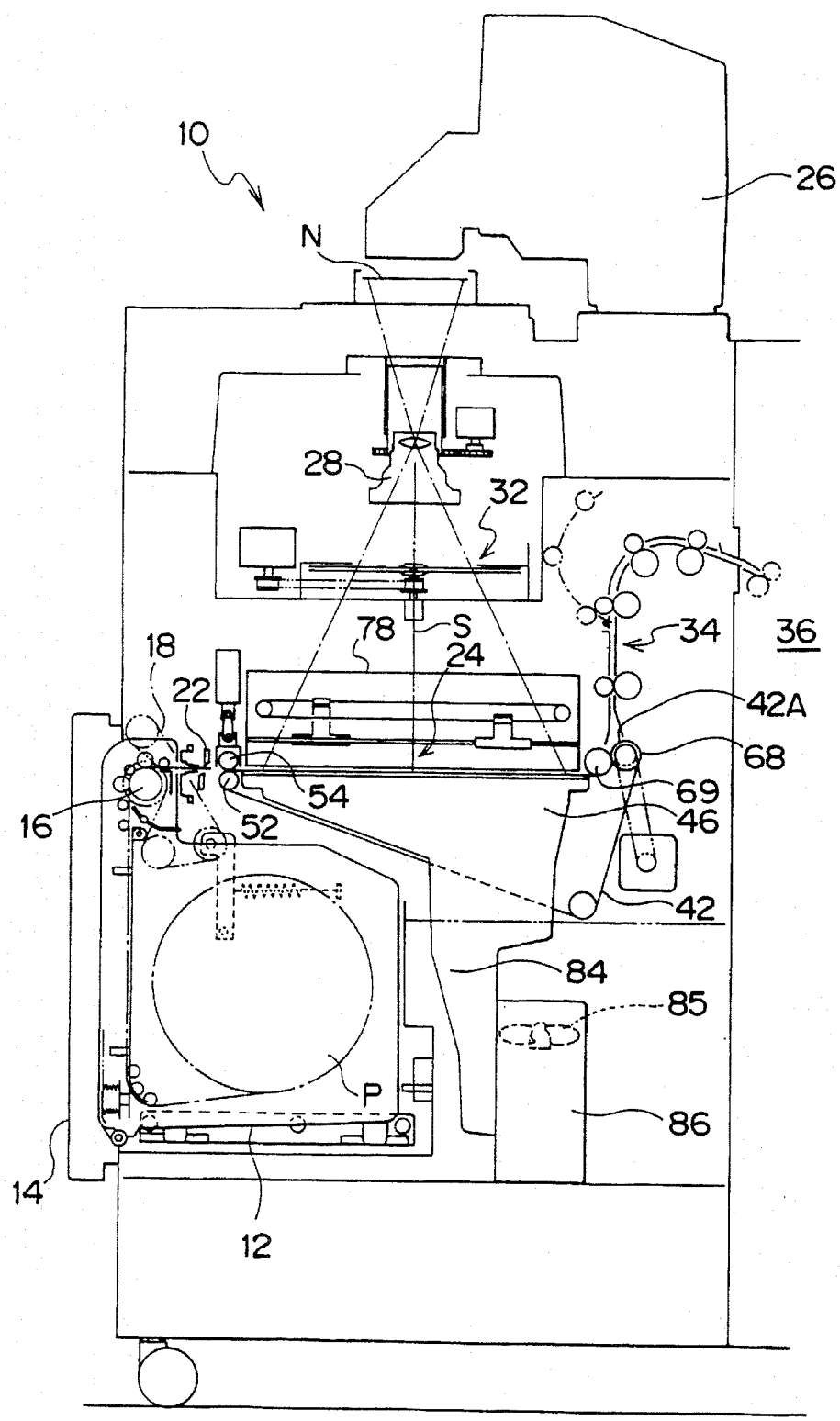
FIG. 1 is a vertical cross-sectional view showing a photographic printer to which the present invention is applied.

FIG. 1 shows a photographic printer 10 to which the present invention is applied. A magazine 12 on which photographic paper P has been wound in roll form is loaded into the photographic printer 10. After the magazine 12 has been inserted into the photographic printer 10, an opening and closing door 14 is closed so that the magazine 12 is brought into a fully loaded state.

The magazine 12 has a driving roller 16 on which a portion near the leading end of the photographic paper P is wound. The driving roller 16 is rotated under a driving force of a driving belt 18 provided within the photographic printer 10 so as to introduce the leading end of the photographic paper P into the photographic printer 10.

The photographic paper P, which has been withdrawn from the magazine 12, is cut to a desired length by a cutter 22. Thereafter, the cut photographic paper P is conveyed to an image printing position 24. At the image printing position 24, an image on a negative film N is printed onto the photographic paper P by printing light emitted from a light source 26 through an optical means 28 and a shutter 32. The printed photographic paper P is fed via a conveying path 34 to a developer unit 36 where a printed image is developed.

(Structure of the neighborhood of image printing position)

Figure 2:
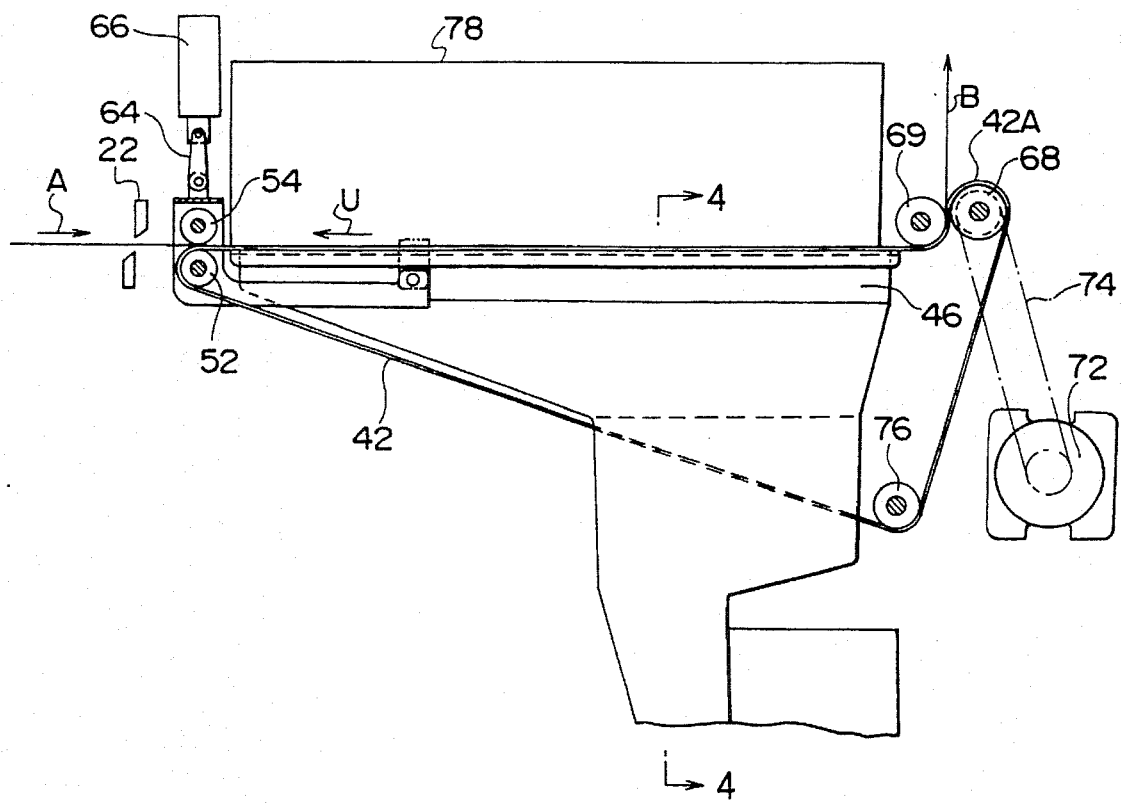
FIG. 2 is an enlarged vertical cross-sectional view showing the neighborhood of an image printing position shown in FIG. 1.
Figure 3:
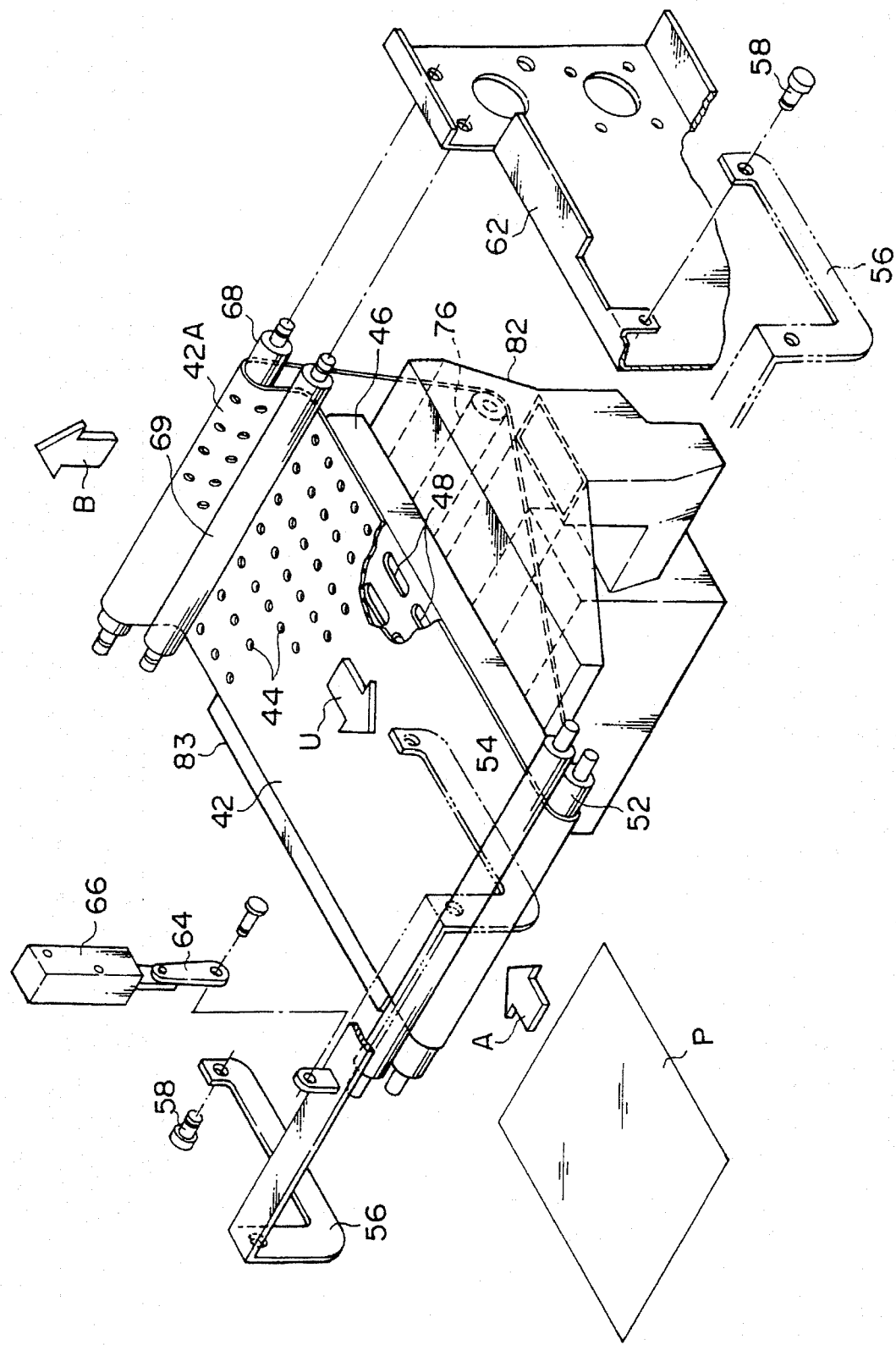
FIG. 3 is an exploded perspective view illustrating a part of FIG. 2.
Figure 4:
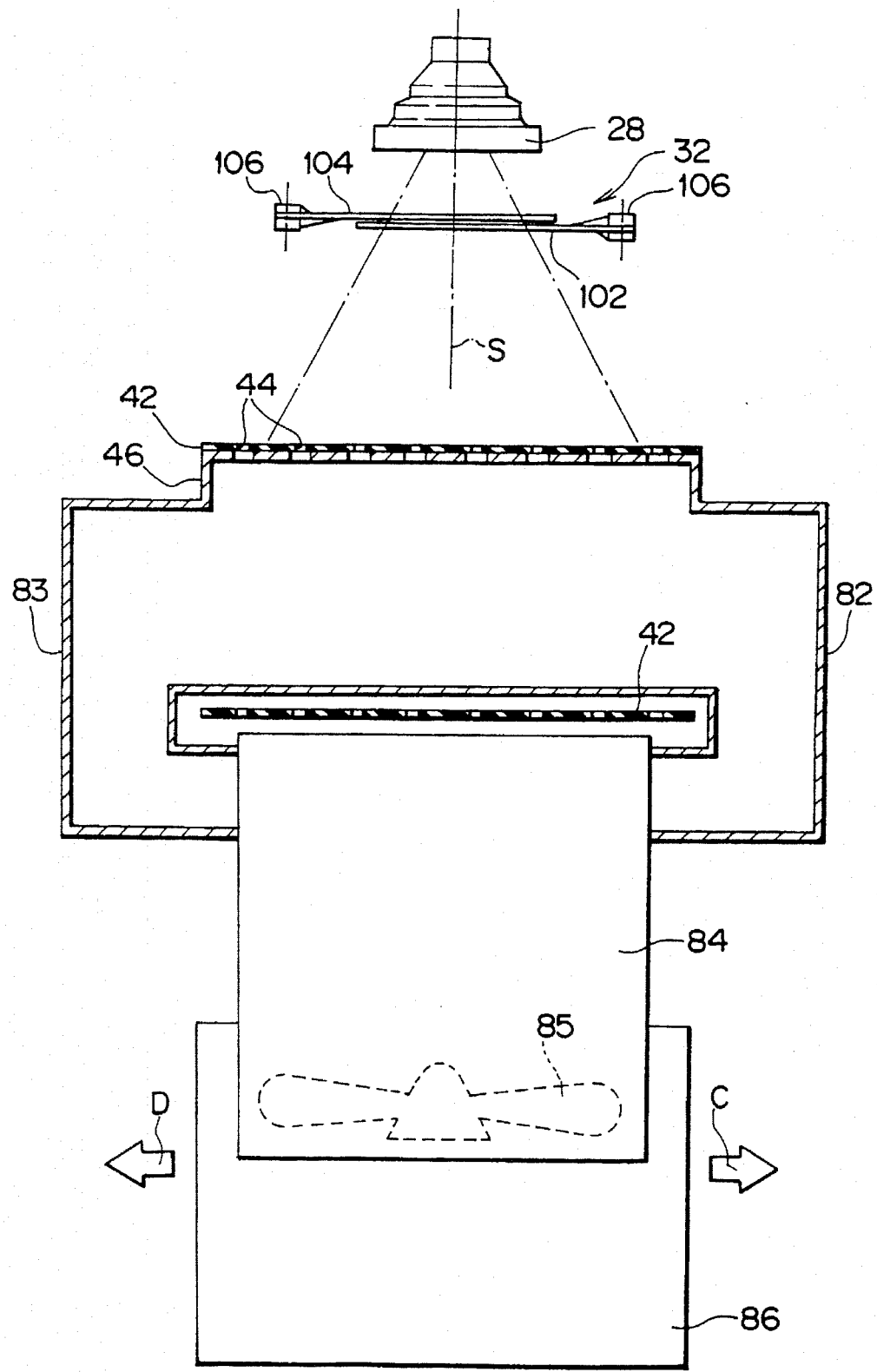
FIG. 4 is a cross-sectional view taken along line IV—IV of FIG. 2.

As shown in FIGS. 2 through 4, an endless belt 42 wound around rollers 52, 68 and 76 respectively disposed in the vertexes of a substantially triangular path is located in the image printing position on the downstream side of the cutter 22. The endless belt 42 has a plurality of small through-holes 44 defined therein over the entire areas of the endless belt 42. A part of the endless belt 42 is placed on a support table 46 so that the endless belt 42 is horizontally disposed at the image printing position. As shown in FIG. 3, the support table 46 has a number of elongated holes 48 defined therein. The elongated holes 48 correspond to vacuum communication portions respectively and serve so as to absorb or suck the photographic paper P on the endless belt 42 into the endless belt 42 through the small through-holes 44.

A winding roller 52 for winding thereon an end of the endless belt 42, which extends on the upstream side thereof, is provided on the upstream side (in the direction indicated by arrow U) of the support table 46 so as to be horizontally supported by a support base frame 62 (see FIG. 3). An up-and-down roller 54 is horizontally disposed so as to interpose the endless belt 42 between the up-and-down roller 54 and the winding roller 52. The up-and-down roller 54 has axially-extending ends rotatably supported by a swing arm 56. The swing arm 56 is supported by the support base frame 62 through a pair of bearings 58. Further, the swing arm 56 is coupled to a self-holding solenoid 66 through a link 64. Thus, when a pulse voltage is applied to the solenoid 66 to energize the solenoid 66, the swing arm 56 is elevated and turned about the bearings 58 so that the up-and-down roller 54 is separated from the endless belt 42. On the other hand, when the solenoid 66 is supplied with a pulse voltage for performing the inverse operation to the solenoid 66, the swing arm 56 and the up-and-down roller 54 are brought into contact with the upper surface of the endless belt 42 by their own weights or an urging force of an unillustrated elastic body so that the photographic paper P can be held between the up-and-down roller 54 and the endless belt 42.

A part of the endless belt 42 on the downstream side of the support table 46 extends toward the downstream side further distant from the support table 46 so as to be wound around a guide roller 68. The guide roller 68 is disposed in a position identical to that of the up-and-down roller 54 or in a position slightly higher than that of the up-and-down roller 54. The guide roller 68 is provided adjacent to a guide roller 69 provided just on the upstream side of the guide roller 68. The guide roller 69 presses the outer periphery of the endless belt 42 in a downward direction. The outer periphery of the endless belt 42 is wound around the guide roller 69 over the perimeter of about one-fourth the outer periphery of the guide roller 69. Thereafter, the endless belt 42 is wound around the guide roller 68 over the perimeter of about two-third the outer periphery of the guide roller 68. Thus, the endless belt 42, i.e., the portion continuously wound around the guide rollers 69 and 68 is shaped in the form of a substantially S letter. The guide roller 68 is driven and rotated by undergoing a driving force of a motor 72 through a timing belt 74 so as to rotate and drive the endless belt 42 in a clockwise direction shown in FIG. 2.

Thus, the guide roller 68 and the guide roller 69 are activated so that the endless belt 42 forms an inverted U-shaped protrusion 42A on the downstream side away from the image printing position during a transient period in which the endless belt 42 circulates. Therefore, the photographic paper P on which the image has already been printed, is interposed between the protrusion 42A and the guide roller 69 so that the direction of feeding the photographic paper P is changed from the horizontal direction (i.e., the direction indicated by arrow A) to the vertical direction (i.e., the direction indicated by arrow B). As a result, the photographic paper P is conveyed in the vertical direction.

The endless belt 42 is wound around a tension roller 76 at a lower position between the guide roller 68 and the winding roller 52 so as to form a locus of motion of the endless belt 42, which moves in a substantially triangular path. As shown in FIG. 1, an easel device 78 is provided at the upper part of the endless belt 42 so as to cover the periphery of the photographic paper P where a bordered image whose periphery is shaped in a white frame is printed on the photographic paper P.

(Description of sucking device)

As shown in FIG. 4, the support table 46 has an inner portion defined in hollow form. Communication ducts 82 and 83 are coupled to their corresponding transversely-extending ends of the endless belt 42. These ducts 82 and 83 bypass a folded portion of the endless belt 42, which is disposed below the support table 46, so as to reach a position below the endless belt 42, whereby the ducts 82 and 83 are coupled to a communication duct 84. The communication duct 84 further extends in a downward direction so as to be connected to a fan box 86 with a suction fan 85 provided therein.

Thus, air in the support table 46 is discharged from loop-in transversely-extending ends (corresponding to ends extending in left and right directions in FIG. 4) of the endless belt 42 through the communication ducts 82 and 83. Thereafter, the air is sucked by the suction fan 85 so as to blow in the directions indicated by arrows C and D. Therefore, the inside of the support table 46 is brought into negative pressure, which is applied to the photographic paper P on the endless belt 42 through the small through-holes 44 of the endless belt 42 and the elongated holes 48 of the support table 46 so as to absorb the photographic paper P into the endless belt 42. Since the communication ducts 82 and 83 are in communication with the support table 46 at the transversely-extending both ends of the endless belt 42 in particular, a substantially uniform absorbing force is applied to the endless belt 42 over the entire transverse area of the endless belt 42 so that the photographic paper P is securely attached onto the endless belt 42.

(Description of shutter portion)

Figure 5:
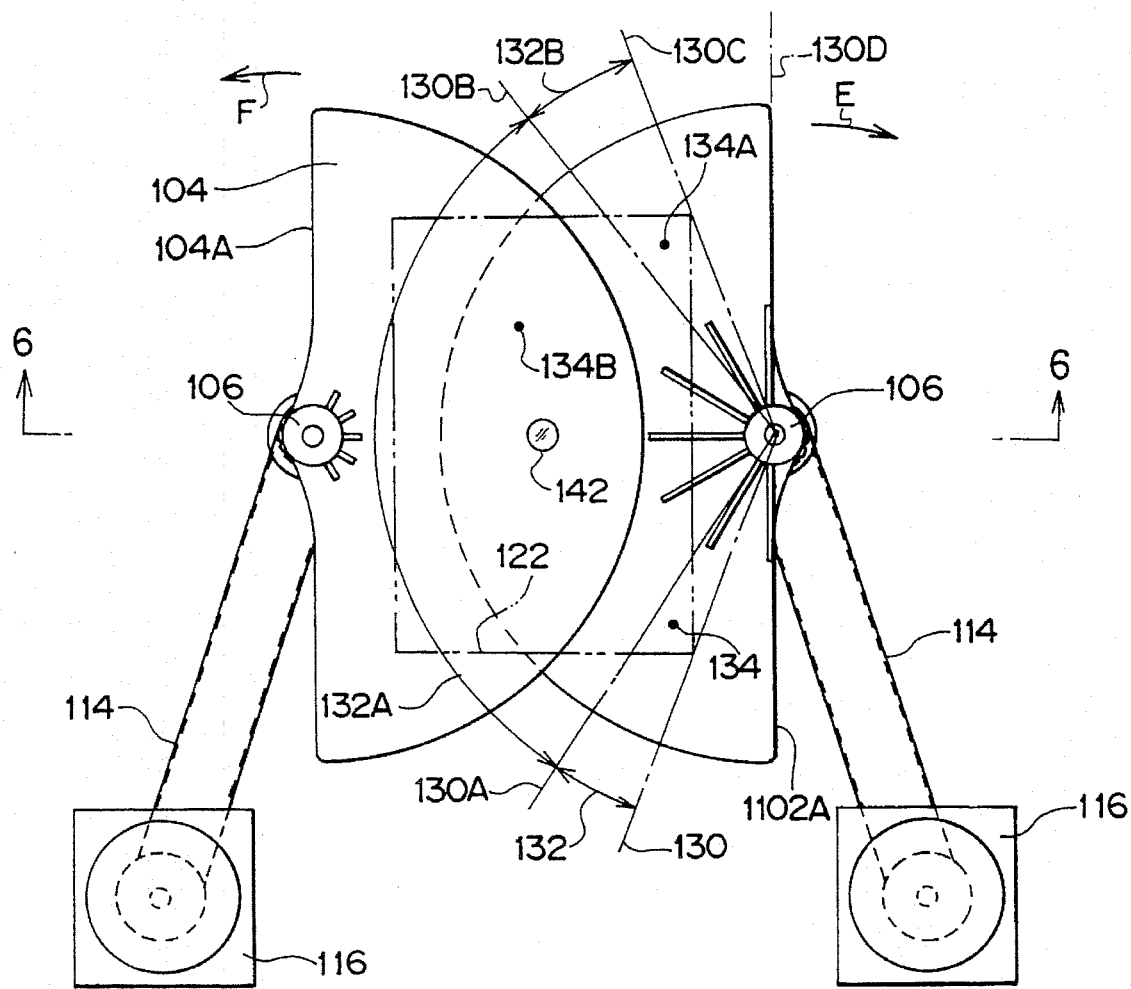
FIG. 5 is a plan view showing a shutter.
Figure 6:
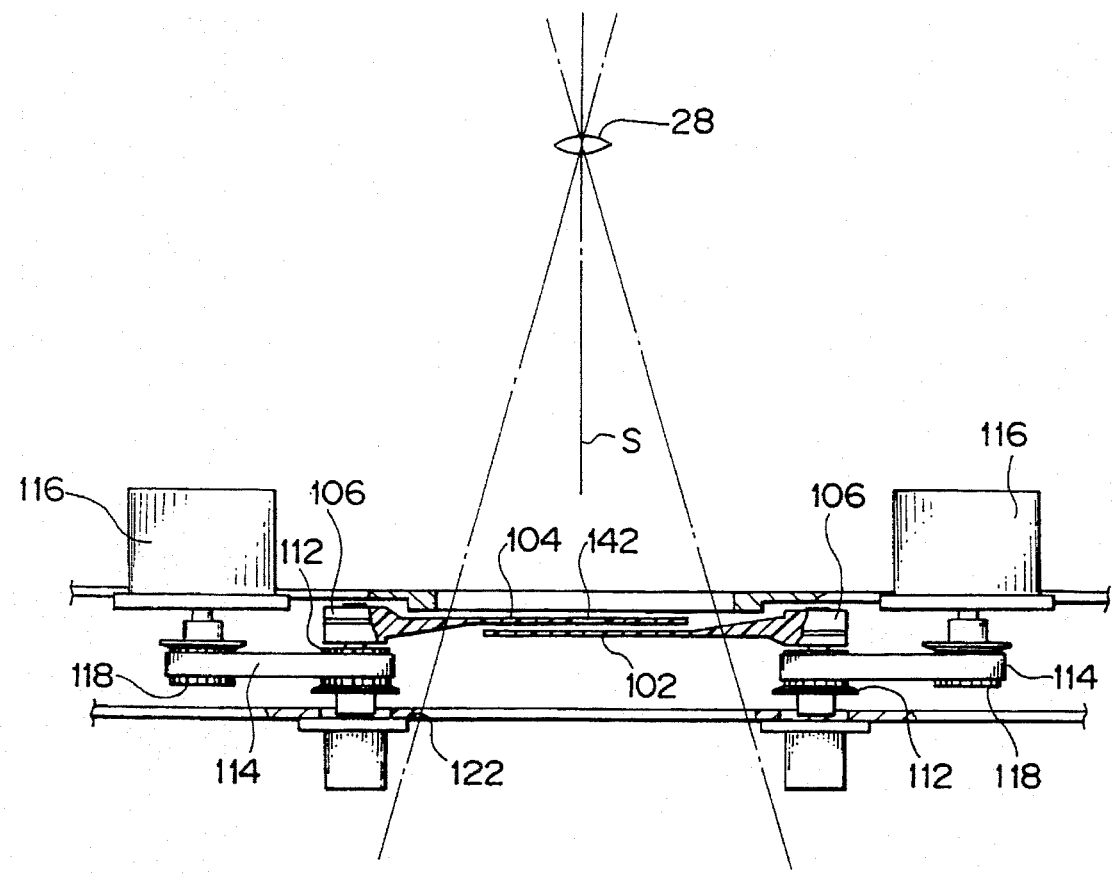
FIG. 6 is a cross-sectional view taken along line VI—VI of FIG. 5.
Figure 7:
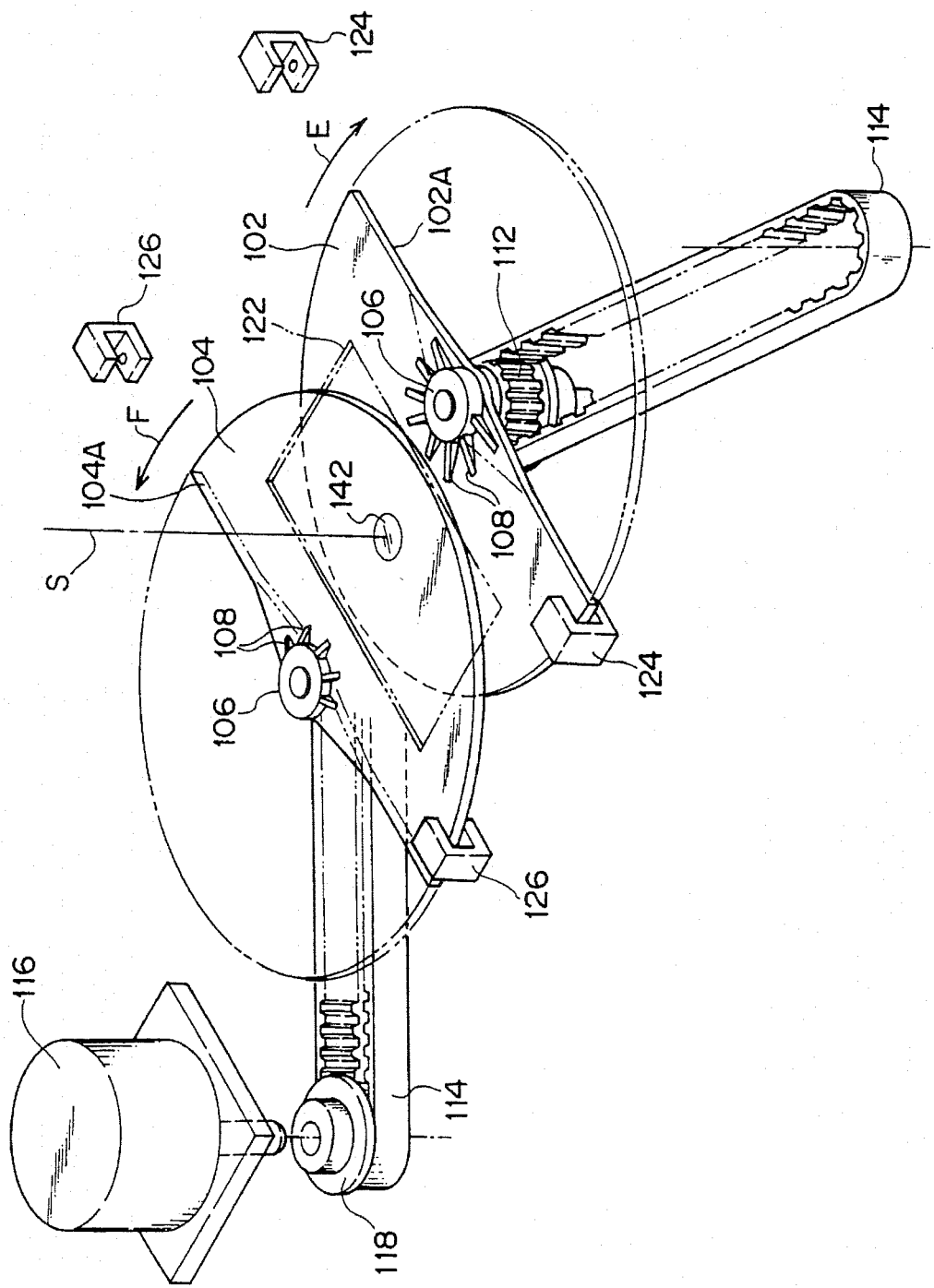
FIG. 7 is a view for describing the manner in which one-sided sensors illustrated in an exploded perspective view and showing a shutter are spaced away from their corresponding shutter bodies.

A shutter 32 provided between the photographic paper P located in the printing position and the optical means 28 has a pair of shutter bodies 102 and 104 as shown in FIGS. 5 through 7. Each of the shutter bodies 102 and 104 is shaped substantially in the form of a semicircle. Bosses 106, 106 project from the centers of rotation of the shutter bodies 102 and 104 respectively. A plurality of ribs 108 are provided on the peripheries of these bosses 106 so as to be mounted between the shutter bodies 102 and 104 as reinforcing materials. Incidentally, these shutter bodies 102 and 104 are basically identical in structure to each other. When they are actually used, one of the shutter bodies is used in a state of being inverted to the other thereof. The axial centers of these bosses 106 vertically extend and extend parallel to a printing optical axis S.

Timing belts 114 are respectively wound around pulleys 112 fixed to the lower parts of the bosses 106 so as to be coaxial with the centers of rotation of the shutter bodies 102 and 104. The timing belts 114 are mounted on output shaft pulleys 118 of motors 116 respectively. The shutter bodies 102 and 104 are repeatedly rotated and stopped every 180° by the motors 116 respectively. Namely, the state illustrated in the drawing shows a state in which a hole or window 122 transmissive of printing light, which is defined in the support base frame 62, has been closed by the shutter bodies 102 and 104. A state in which the shutter bodies 102 and 104 are rotated by 180° in the directions indicated by arrows E and F from this state shows an opened state of the light-transmissive window 122. The shutter bodies 102 and 104 stop at this position. The shutter bodies 102 and 104 are rotated and stopped by respectively detecting portions near points where respective pairs of linear portions 102A and 104A of the shutter bodies 102 and 104 respectively intersect circular arcs thereof and controlling the driving of the motors 116.

Since the centers of rotation of the pair of sectorial shutter bodies 102 and 104 are located respectively at either side of the light transmissive window 122 as described above, the light transmissive window 122 can be reliably opened and closed irrespective of the use of the shutter bodies 102 and 104 each of which is small in area. In this regard, the sectorial angles of the shutter bodies 102 and 104 are not necessarily limited to 180°. Alternatively, the sectorial angles of the shutter bodies 102 and 104 may be ones that are able to close or open the light transmissive window 122 according to the positions where the two shutter bodies rotate.

Since the entire area of the light transmissive window 122 is closed by superposing the two shutter bodies 102 and 104 on one another even if the entire area of the light transmissive window 122 is not closed by either the shutter body 102 or 104 as shown in FIG. 5, the light transmissive window 122 can be fully closed by using the small shutter bodies 102 and 104.

The shutter bodies 102 and 104 are rotated in the directions indicated by arrows E and F respectively. Namely, each of the shutter bodies 102 and 104 is rotated in one direction. Thus, the time required to open the light transmissive window 122 can be rendered uniform even if easy-to-control motors such as a pulse motor, etc. are used as the motors 116. As will be described below, a uniform exposure time can be obtained at any portion in the light transmissive window 122 by using the shutter according to the present invention regardless of the fact that the shutter bodies 102 and 104 respectively have accelerations at early and final stages of their rotation or immediately before they stop and they vary in speed.

Advantages of the shutter according to the present invention will now be described in detail by taking the shutter body 102 shown in FIG. 5 as an example. When the shutter body 102 starts to rotate in the direction indicated by arrow E from the state (closed state) shown in FIG. 5 under the driving force of the motor 116, the rotational speed of the shutter body 102 is not kept constant (accelerated rotating state) even if the linear portion pair 102A starts to open a part of the light transmissive window 122, i.e., the linear portion pair 102A starts to rotate by an angle (corresponding to an angular position where the linear portion pair 102A starts to open the light transmissive window 122) indicated by a rotational angular position 130 under a driving force of a normal motor. A constant speed can be obtained only when the linear portion pair 102A reaches near an angular position 130A. In order to accurately stop the linear portion pair 102A at a position where the light transmissive window 122 is opened, i.e., in a state in which the linear portion pair 102A has been rotated by 180° in the direction indicated by arrow E from the state shown in FIG. 5, the linear portion pair 102A must start to decelerate in a state in which the linear portion pair 102A has passed through a rotational angular position 130B corresponding to about 45° before a stop position of the linear portion pair 102A. The linear portion pair 102A is held in a decelerated state between the rotational angular position 130B and a rotational angular position 130D where the linear portion pair 102A is rotated 180° from the state shown in FIG. 5 after the linear portion pair 102A has passed through a rotational angular position 130C where the light transmissive window 122 is fully opened. The relationship between the time and velocity required to rotate the linear portion pair 102A when the light transmissive window 122 is opened and closed by the shutter body 102, is shown in FIG. 8.

Taking into consideration that the shutter body 102 repeatedly opens or closes the light transmissive window 122 every 180°, the shutter body 102 constantly rotates over respective portions in a zone 132A which falls within the light transmissive window 122. Further, any portion in the zone 132A has the same release time (the time over which the light transmissive window is fully open) without being affected by a rotational acceleration. Since respective portions included in a zone 132 between the rotational angular position 130 and the rotational angular position 130A both shown in FIG. 5 and a zone 132B between the rotational angular positions 130B and 130C are affected by accelerations (including decelerations), a difference in release time becomes a problem. Since, however, the linear portion pair 102A is rotated at each uniform 180° and the sectorial angle thereof is 180°, time intervals TA and TB required to expose a point 134 to the light in the zone 132 and a point 134A in the zone 132B become equal to a time interval TC required to expose a point to the light 134B in the zone 132A where the shutter body 102 rotates at the constant speed, as shown in FIG. 8 if accelerations 137A and 137B are equal to each other and decelerations 138A and 138B are equal to each other as represented by a velocity curve G (see FIG. 8) showing the manner of change from the closed state of the light transmissive window 122, which is shown in FIG. 5 to the opened state thereof and a velocity curve H showing the manner of change from the released state thereof to the closed state thereof.

The directions of rotating the shutter bodies 102 and 104 are not necessarily limited to the E and F directions if they can be rotated in one direction. According to the velocity curve G shown in FIG. 8, a constant-speed portion exists between the acceleration 137A and deceleration 138A. However, a curve in which the constant-speed portion does not exist and a decelerated portion exists immediately after the accelerated portion, may be used.

Incidentally, the velocity curve G shown in FIG. 8 shows a variation in velocity at the time that one (corresponding to the lower part shown in FIG. 5) of the pair of linear portions 102A extending in a radial direction from the boss 106 of the shutter body 102 is activated so as to open the light transmissive window 122. On the other hand, the velocity curve H shows where the other of the pair of linear portions 102A is activated so as to block the light transmissive window 122. If ones other than straight lines and identical in shape to each other are used as the pair of linear portions 102A, a difference is not produced between exposure times at any points in the light transmissive window 122 and nonuniformity does not occur in a developed image.

In the illustrated embodiment, each of the shutter bodies is shaped in the form of a semicircle having a central angle of 180°. However, the shape of each shutter body is not necessarily limited to or by the semicircle. Alternatively, the shape of the shutter body can be represented as a sector whose central angle exceeds 180° or is less than 180°. If the central angle is less than 180°, then the motor must be controlled in such a manner that one (corresponding to the lower part of a pair of radii if the semicircle 102 is considered to be a sector in FIG. 5) of a pair of linear portions equivalent to the radius of the sector, which is delayed in rotation with respect to the direction of rotation of the sector or shutter body at a starting position (where the light transmissive hole is being blocked) of a shutter for bringing the light transmissive window into an opening state, temporarily stops at the other thereof (corresponding to the upper part of the pair of radii) forwarded or advanced in rotation with respect to the rotational direction of the sector, the shutter is next further rotated and the advanced portion stops at the position where the delayed portion at the starting position exists. Thus, if the rotation of the motor is divided into three during the releasing and closing operations of the shutter to adjust the releasing and closing positions of each shutter body, an exposure time can be held constant at any location even if an accelerated or decelerated portion of the shutter falls within the light transmissive hole.

However, it is preferable that each of the shutter bodies is semicircular, i.e., has a central angle of 180°. When the central angle is not 180°, the following drawbacks occur: (1) the control method carried out by software is complex; (2) vibrations which result in blurring of the print occur during printing; (3) if the shutter bodies are stopped for a short time, the motor does not operate correctly due to the vibrations which occur when the shutter bodies begin to move again; (4) because the drive cycle of the motor must be divided into three cycles, the acceleration in the driving of the second cycle in particular is large, which necessitates use of a large capacity motor. (Description of ND filter)

Further, an ND filter 142 is embedded into the shutter body 104. The ND filter 142 is disposed on the optical axis S in the illustrated state in which the shutter body 104 blocks the light transmissive window 122. Thus, since the shutter body 102 is disposed below the ND filter 142 in the illustrated state, any exposure does not act on the photographic paper P. However, when only the shutter body 102 is rotated in the direction indicated by arrow E in this condition, the ND filter 142 enables the printing light to pass therethrough. The ND filter 142 is an achromatic color filter (which is also called a "neutral density filter") which does not show spectral selective absorption. The ND filter 142 is used for the purpose of dimming light without varying spectral composition of incident light.

Namely, when a standard exposure condition is determined by these shutter bodies 102 and 104 upon firstly using the photographic printer 10, the ND filter 142 can expose the photographic paper P to light by rotating only the shutter body 102 by half. When the normal image printing is thereafter effected on the photographic paper P, the shutter bodies 102 and 104 are both simultaneously rotated in the directions indicated by arrows E and F from the illustrated state every 180° so as to open and cut off the light transmissive window 122.

Incidentally, the ND filter 142 may not be provided on the optical axis S if it is mounted to an area where the shutter bodies 102 and 104 overlap each other.

A printing operation using the shutter according to the present invention will now be described.

When the magazine 12 having the photographic paper P accommodated therein is inserted into the photographic printer 10 and the opening and closing door 14 is closed, the magazine 12 is loaded into the photographic printer 10 and the driving roller 16 is pressed against the driving belt 18 to enter into a driving-force transferring state.

When the driving roller 16 is driven by the unillustrated motor, the leading end of the photographic paper P is withdrawn from the magazine 12 so as to be conveyed to the cutter 22. The cutter 22 cuts the leading end of the photographic paper P so as to truncate irregular shapes. Further, the photographic paper P is conveyed to the downstream side so as to be inserted between the winding roller 52 and the up-and-down roller 54. In this condition, the solenoid 66 is energized to elevate the up-and-down roller 54. When the photographic paper P is fed to the cutter 22 by a length corresponding to the size of a printing image, the cutter 22 is operated again to cut the photographic paper P. The up-and-down roller 54 is lowered to convey the cut photographic paper P so that the photographic paper P is held and fed between the up-and-down roller 54 and the winding roller 52 through the endless belt 42.

Since the leading end of another photographic paper P fed simultaneously with the feeding of the cut photographic paper is placed on the endless belt 42, the negative pressure in the support table 46 is applied to the photographic paper P through the small through-holes 44 so that the photographic paper P is absorbed into the endless belt 42. The endless belt 42 conveys the photographic paper P to the printing position under the driving force of the motor 72 and stops. In this condition, the end on the upstream side of the photographic paper P has already been released from the up-and-down roller 54.

Since, in this condition, the shutter bodies 102 and 104 are reversed under the driving forces of the motors 116 so as to open the light transmissive window 122, the original image on the negative film N is printed onto the photographic paper P through the optical means 28. Since the same release time can be obtained at any portion of the light transmissive window 122 as shown in FIG. 8 although the shutter bodies 102 and 104 are accelerated or decelerated at the early and final stages of their rotation, an accurate printing image is applied onto the photographic paper P.

When the image printing is finished, the endless belt 42 is rotated again so as to convey the photographic paper P to the downstream side. Thus, the absorption of the photographic paper P into the endless belt 42 is reliably performed over the entire area of the photographic paper P. Namely, since the negative pressure is supplied to the support table 46 from the transversely-extending ends of the endless belt 42 through the communication ducts 82 and 83, a variation in the negative pressure applied in the transverse direction of the endless belt 42 is low and the negative pressure can be applied over the entire area of the photographic paper P in a substantially uniform level.

When the photographic paper P is further conveyed horizontally so as to reach the guide roller 69, the photographic paper P is separated from the support table 46 so that the absorption of the photographic paper P into the endless belt 42 by the negative pressure is released. Simultaneously, the photographic paper P is conveyed in the vertical direction (i.e., in the direction indicated by arrow B) along the protrusion 42A, so that the direction of feeding the photographic paper P is changed. Thereafter, the photographic paper P is fed to the developer unit 36 through the conveying path 34.

If the protrusion 42A is not provided on the downstream side of the printing position, it is then necessary to provide an upwardly-curved guide means at a position in the right direction of the endless belt 42 shown in FIG. 2 and turned aside from the conveying path of the endless belt 42. Therefore, the horizontally-extending conveying path for the photographic paper P is formed so as to become longer than the conveying path shown in FIG. 2 toward the right side, whereby a large mounting space is needed.

Prior to the photographic printing process, the standard exposure condition is determined using the ND filter 142. When only the shutter body 102 is reversed in the arrow E direction from the state shown in the drawing in this case, the ND filter 142 is brought into a state of allowing the printing light to pass through the photographic paper P.

The standard exposure condition is set as follows. Namely, the photographic paper P is exposed to light through the ND filter 142 under an exposure which has been determined based on a measured value of the intensity of light transmitted through the ND filter 142 and a standard exposure condition set using the ND filter 142 in a state in which the ND filter 142 has been inserted into an exposure path. Thereafter, the standard exposure condition is determined in such a manner that the density of an image obtained as a result of development of the exposed photographic paper P reaches a target density. The target density used for setting the standard exposure condition can make use of a value obtained by measuring a screen density of a print obtained from a standard film upon setting the standard exposure condition. However, a predetermined density may be used as the target density. If the target density is fixed at each film type, it can be then applied to exposure of a plurality of types of color originals to light. When the target density is determined using the standard film, an exposure condition, i.e., a full correction condition or a high correction condition fixed so as to have little influence of two of the three primary colors on any one thereof or have a slight influence of the two on any one of them in order to correct a difference in characteristic between the standard film and the ND filter 142, may be used. As the target density, an image density may be used which has been obtained by exposing the photographic paper P to light through the ND filter 142 using the standard exposure condition properly fixed without using the standard film and developing the exposed photographic paper P.

A variation in the exposure condition with respect to the photographic printer 10, which has been set based on the measured value of the intensity of light transmitted through the ND filter 142, is corrected. Thereafter, an image density obtained by developing the photographic paper P exposed to light through the ND filter 142 is corrected so as to reach the target density in the same manner as described above to thereby determine a standard exposure condition. It is thus possible to separate a difference in characteristics between the photographic printer 10 and the photographic paper P, for example, and correct it.

According to the above description, a contact-type stop mechanism using a stopper which provides a spring urging force as was necessary for a conventional shutter driven by a spring and a solenoid, becomes unnecessary by using motors such as a pulse motor, etc. for driving the shutter bodies. The durability is improved.

According to the present invention, a photographic printing shutter can be obtained which is reduced in size and is free from nonuniformity in exposure. Further, the printer can be further simplified in structure by using a photographic printing shutter with a light attenuating filter, according to the present invention and the influence of heat emitted from a light source upon the light attenuating filter can be reduced.

Having now fully described the invention, it will be apparent to those skilled in the art that many changes and modifications can be made without departing from the spirit or scope of the invention as set forth herein.

What is claimed is:

1. A photographic printing shutter comprising:
    a pair of shutter bodies each shaped in the form of a sector, for cutting off printing light and allowing the printing light to pass;
    a pair of rotatable shafts disposed on opposite sides of a light transmissive window and respectively fixed to said pair of sectorial shutter bodies, the printing light passing through the light transmissive window; and
    driving means for respectively rotatably shifting said pair of sectorial shutter bodies between a closing position where said pair of sectorial shutter bodies cuts off the printing light passing through the window and an opening position where said pair of sectorial shutter bodies allows the printing light to pass through the window.

2. A photographic printing shutter as claimed in claim 1, wherein said sector is a semicircle having a central angle of 180°.

3. A photographic printing shutter as claimed in claim 2, wherein an angle of rotation between the closing and opening positions of said pair of shutter bodies is 180°.

4. A photographic printing shutter as claimed in claim 1, wherein said pair of shutter bodies overlap each other in the closing position.

5. A photographic printing shutter as claimed in claim 4, further comprising a light attenuating filter, said light attenuating filter being provided within one of said pair of shutter bodies so as to fall within an area where said pair of shutter bodies overlap each other in the closing position.

6. A photographic printing shutter as claimed in claim 1, wherein each of said driving means comprises a driving belt and a motor.

7. A photographic printing shutter as claimed in claim 1, wherein each of said pair of shutter bodies has an acceleration at an early stage of rotation thereof and a deceleration at a final stage of rotation thereof.

8. A shutter as claimed in claim 7, wherein the acceleration in moving from the opening position to the closing position and from the closing position to the opening position is equal, and wherein the deceleration in moving from the opening position to the closing position and from the closing position to the opening position is also equal.

9. A photographic printing shutter as recited in claim 1, wherein
    said shutter bodies have an acceleration at an early stage of rotation thereof and a deceleration at a final stage of rotation thereof, and wherein the acceleration in moving from the opening position to the closing position and from the closing position to the opening position is equal, and wherein the deceleration in moving from the opening position to the closing position and from the closing position to the opening position is also equal.

10. A photographic printing shutter as claimed in claim 9, wherein said sector is a semicircle having a central angle of 180°.

11. A photographic printing shutter as claimed in claim 10, wherein an angle of rotation between the closing and opening positions of said pair of shutter body is 180°.

12. A photographic printing shutter comprising:
    a pair of rotatable shafts disposed substantially parallel to an optical axis of a printing light and on opposite sides of a light transmissive window through which the light passes;
    a pair of shutter bodies respectively fixed to said pair of rotatable shafts and rotated about said pair of rotatable shafts so as to move between a closing position where said pair of shutter bodies overlap to prevent the printing light from passing through the window and an opening position where said pair of shutter bodies allows the printing light to pass through the window;
    a light attenuating filter provided within one of said pair of shutter bodies so as to fall within an area where said pair of shutter bodies overlap each other in the closing position; and
    at least one driving means for rotating said pair of shutter bodies about said pair of rotatable shafts, said at least one driving means comprising means for selecting a first mode for simultaneously rotating said pair of shutter bodies and a second mode for rotating the other of said pair of shutter bodies alone.

13. A photographic printing shutter as claimed in claim 12, wherein only said one shutter body having said light attenuating filter disposed therein is disposed in the closing position when a standard exposure condition is determined and said pair of shutter bodies are simultaneously rotated when photographic printing is to be effected.

14. A photographic printing shutter as claimed in claim 12, wherein said light attenuating filter is an ND filter.

15. A method of controlling an exposure time using a photographic printing shutter, comprising the steps of:
    positioning a pair of semicircular shutters, which respectively have a rotatable shaft located in a center of rotation of each shutter at opposite sides of a light transmissive window, at a position where said pair of semicircular shutters overlap to close the light transmissive window disposed between the shafts;

rotating said pair of semicircular shutters by 180° about the rotatable shafts so as to open the light transmissive window; and further rotating said pair of semicircular shutters by 180° so as to return said semicircular shutters to the closed position, thereby allowing the same quantity of light to pass at every portion in the light transmissive window.

16. A method as claimed in claim 15, wherein each of said pair of semicircular shutters has an acceleration and a deceleration when being rotated by 180°.

17. A method as recited in claim 16, wherein the acceleration in moving from the opening position to the closing position and from the closing position to the opening position is equal, and wherein the deceleration in moving from the opening position to the closing position and from the closing position to the opening position is also equal.

* * * * *